United States Patent [19]

Frissora

[11] Patent Number: 4,489,499
[45] Date of Patent: Dec. 25, 1984

[54] MULTI-AXES CENTERING FIXTURE

[75] Inventor: Anthony P. Frissora, Mendham Township, Morris County, N.J.

[73] Assignee: Allied Corporation, Morris Township, Morris County, N.J.

[21] Appl. No.: 497,969

[22] Filed: May 25, 1983

[51] Int. Cl.³ .......................... G01B 5/14; G01B 5/25
[52] U.S. Cl. .................................... 33/181 R; 33/182
[58] Field of Search ................. 33/174 R, 181 R, 182, 33/333, 354

[56] References Cited

U.S. PATENT DOCUMENTS

| | | | |
|---|---|---|---|
| 737,560 | 8/1903 | Nunnally | 33/181 R |
| 898,349 | 9/1908 | Fielding | 33/182 |
| 1,749,980 | 3/1930 | Loeser | 33/181 R |
| 3,604,121 | 9/1971 | Hull | 33/182 |

FOREIGN PATENT DOCUMENTS

| | | | |
|---|---|---|---|
| 823134 | 11/1951 | Fed. Rep. of Germany | 33/182 |
| 1038294 | 9/1958 | Fed. Rep. of Germany | 33/181 R |
| 1068475 | 11/1959 | Fed. Rep. of Germany | 33/181 R |

Primary Examiner—Richard R. Stearns
Attorney, Agent, or Firm—Paul Yee; Ernest D. Buff; Gerhard H. Fuchs

[57] ABSTRACT

An alignment apparatus for aligning a selected object with respect to a top-dead-center portion of a cylindrical roll includes a support base that is adapted to mount on a peripheral, circumferential surface of the roll and over the top-dead-center portion thereof. A level indicator mechanism mounted on the base indicates the orientation of the base. An outer frame is pivotably mounted on the base to pivot about an outer gimbal axis. An inner frame is pivotably mounted in the outer frame and adapted to rotate about an inner gimbal axis. The inner gimbal axis is oriented substantially perpendicular to the outer gimbal axis. A positioning plate moveably mounts within the inner frame and is adapted to move along a reference plane defined by the inner frame. A follower mechanism connects to the positioning plate to align the positioning plate with a selected portion of the selected object, and a reference mechanism indicates the relative alignment of the positioning plate with respect to the top-dead-center of the cylindrical roll.

12 Claims, 9 Drawing Figures

MULTI-AXES CENTERING FIXTURE

DESCRIPTION

BACKGROUND OF THE INVENTION

1. Field of the Invention

The invention relates to the positioning of a selected object with respect to a top-dead-center portion of a cylindrical roll. More particularly, the invention relates to an apparatus and method for aligning a casting nozzle with respect to the top-dead-center portion of a rotatable chill roll to rapidly cast continuous metal strip.

2. Description of the Prior Art

Conventional apparatus for aligning a selected object, such as a casting nozzle, over the top-dead-center portion of a cylindrical roll or a wheel to cast metal strip have employed a mirror mounted on a fixed-top surface of a two-legged V-block. The V-block is mounted on the peripheral cylindrical surface of the roll and the mirror reflects an image of the object. The image is viewed through a sighting means and by selectively moving the object to align the reflected image with a reference line, the object is aligned with the top-dead-center of the cylindrical roll.

When employed to align a casting nozzle over the top dead center of a rotatable chill roll to rapidly cast metal strip, the conventional device is well suited for determining the amount of lateral displacement of the nozzle and the twist alignment thereof with respect to the top-dead-center of the chill roll. However, such devices have not been able to adequately measure the degree of tilt offset of the nozzle with respect to the local vertical. As a result, the quench rate, the cross section and the physical properties can vary across the width dimension of the rapidly cast strip. In subsequent manufacturing operations, these variations can adversely affect the use of the metal strip to form end products, such as wound transformer cores or motor cores.

Thus, conventional alignment devices have lacked means to measure the degree of tilt offset of a selected object with respect to the local vertical. As a result, when such devices are employed to align a casting nozzle to rapidly cast continuous metal strip, the strip has had physical properties that are less uniform than is desirable.

SUMMARY OF THE INVENTION

The invention provides an apparatus and method for quickly and accurately aligning a selected object with respect to a top-dead-center portion of a cylindrical roll. Generally stated the apparatus includes a support base adapted to mount on a peripheral, circumferential surface of the cylindrical roll and over a top-dead-center portion thereof. A level indicator means mounted on the support base indicates the orientation of the base. An outer frame is pivotably mounted on the base to pivot about an outer gimbal access, and an inner frame is pivotably mounted in the outer frame and adapted to rotate about an inner gimbal axes. The inner gimbal axis is oriented substantially perpendicular to the outer gimbal axis. A positioning plate is moveably mounted in the inner frame and adapted to move along a reference plane defined by the inner frame. Follower means connected to the positioning plate align the positioning plate with a selected portion of the selected object, and references means indicate the relative alignment of the positioning plate with respect to the top-dead-center of the cylindrical roll.

In accordance with the invention there is further provided a method for aligning a selected object with respect to a top-dead-center portion of a cylindrical roll. An outer frame is mounted over the top-dead-center portion of the roll, and the outer frame is pivoted about an outer gimbal axis. An inner frame is pivoted about an inner gimbal axis that is located within the outer frame and is oriented substantially perpendicular to the outer gimbal axis. A positioning plate is moved along a reference plane defined by the inner frame, the plate is aligned with a selected portion of the selected object, and the relative position between the positioning plate and the inner frame is indicated. The selected object is moved along with the positioning plate to establish a selected relative position between the positioning plate and the inner frame, thereby aligning the object with respect to the top-dead-center of the roll.

The invention provides a precise indication of the later displacement and angular twist orientation of a selected object, such as a casting nozzle, with respect to a top-dead-center portion of a cylindrical roll, such as a rotatably chill roll. In addition, the gimbal frames and moveable positioning plate of the invention advantageously provide a precise indication of the amount of tilt offset of the nozzle relative to the local vertical position.

Thus, compared to conventional alignment devices with fixed reference surfaces, the invention provides more precise alignment to the selected object with respect to the local vertical position. When employed to align a casting nozzle with respect to a top-dead-center portion of a rotatable chill roll, the more precise positioning provides a rapid equipment set-up time and a more efficient high speed casting of continuous metal strip. This strip has more uniform physical dimensions and properties and can be more effectively utilized to produce commercial end products, such as wound transformer cores.

BRIEF DESCRIPTION OF THE DRAWINGS

The invention will be more full understood and further advantages will become apparent when reference is made to the following detailed description of the preferred embodiment of the invention and the accompanying drawings in which.

DESCRIPTION OF THE PREFERRED EMBODIMENTS

For the purposes of the present invention and as used in the specification and claims, a "strip" is a piece of material in which the length dimension is much greater than the transverse dimensions. Thus, the term strip includes wire, ribbon, sheet and the like of regular or irregular cross-section.

Also for the purposes of the present invention, a "roll", as used in the specification and claims, is a cylindrical object with a substantially circular cross-section Thus, a roll includes disks, rollers, wheels and the like.

The preferred embodiments of the invention are described with the respect to the alignment of a casting nozzle the top-dead-center of a rotatable chill roll to rapidly cast continuous metal strip. However, is readily apparent that the apparatus can be easily adapted to align various objects, such as machine tools, gas jets and other implements with respect to the top-dead-center portion of a cylindrical roll. All of such adaptations are contemplated as being within the scope of the present invention.

Figure 1:
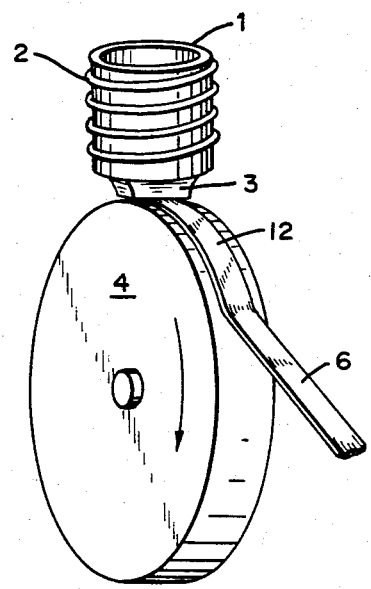
FIG. 1 shows a representative prior art device for rapidly casting continuous metal strip.
Figure 3:
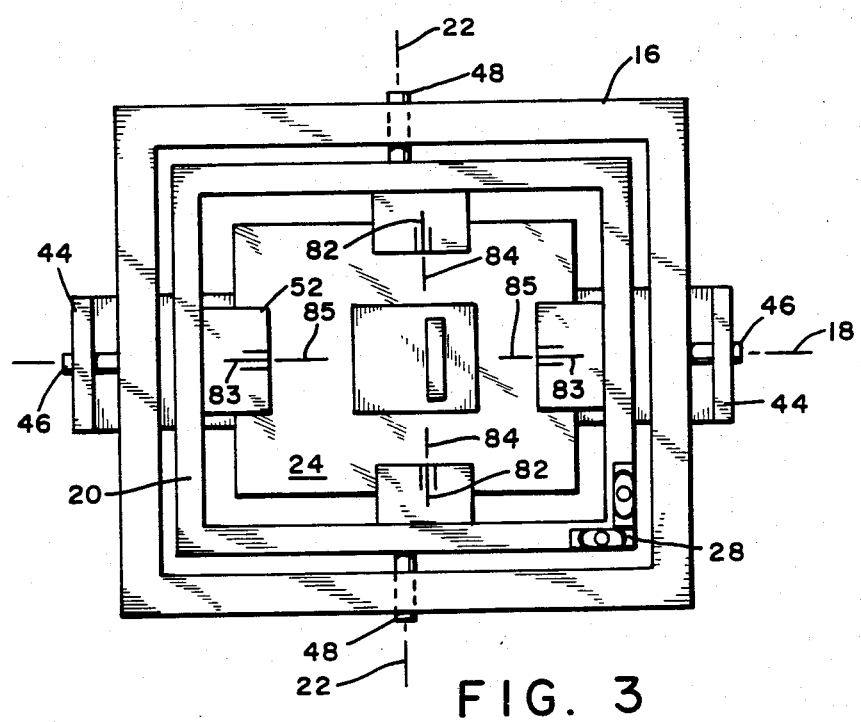
FIG. 3 shows a top plan view of the alignment device of the invention.

FIG. 1 shows a representative prior art apparatus for the high speed casting of continuous metal strip. Molten metal alloy contained in a crucible 1 is heated by heating means 2. Pressurization of the crucible with an inert gas extrudes a stream of molten metal from nozzle 3, located at the base of crucible 1, onto quench surface 12 of rotating quench roll 4 to form a solidified, rapidly moving strip 6. Strip 6 after its breakaway from chilled quench roll 4, is then routed onto a winding reel (not shown).

When casting amorphous, glassy metal alloys or certain crystalline alloys, the molten metal is quenched at an extremely rapid rate of at least about $10^{4°}$ C. per second. The resultant cast strip is thin, typically 25-100 microns thick, and advances off the chill roll at speeds ranging from about 100-2,200 meters per minute.

Figure 2:
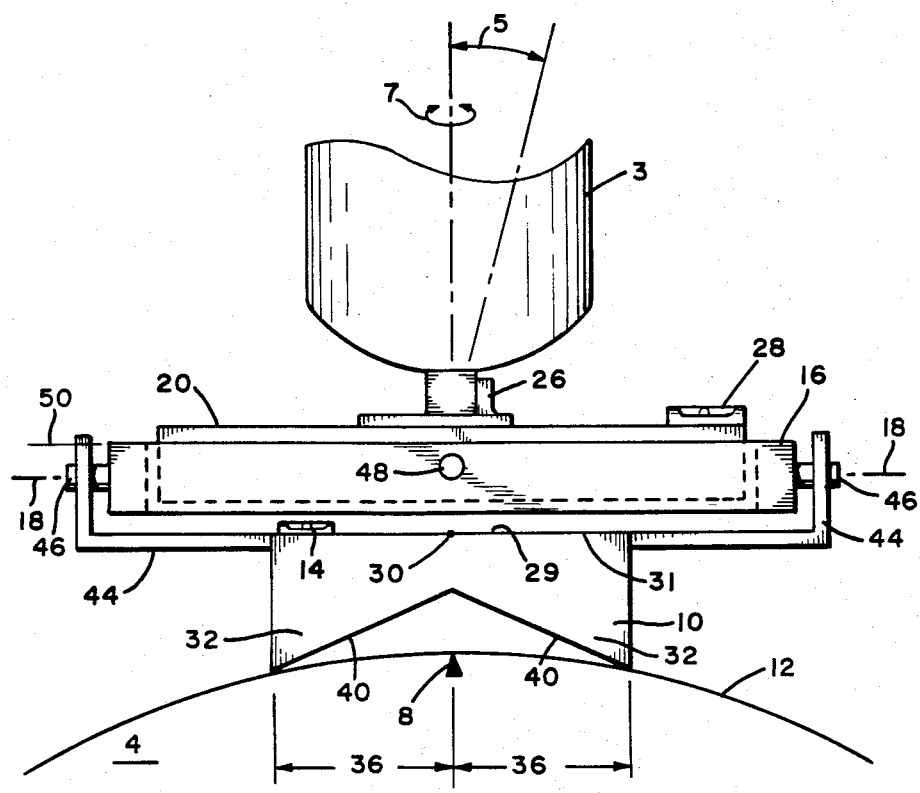
FIG. 2 shows a front elevational view of the alignment device of the invention.
Figure 5:
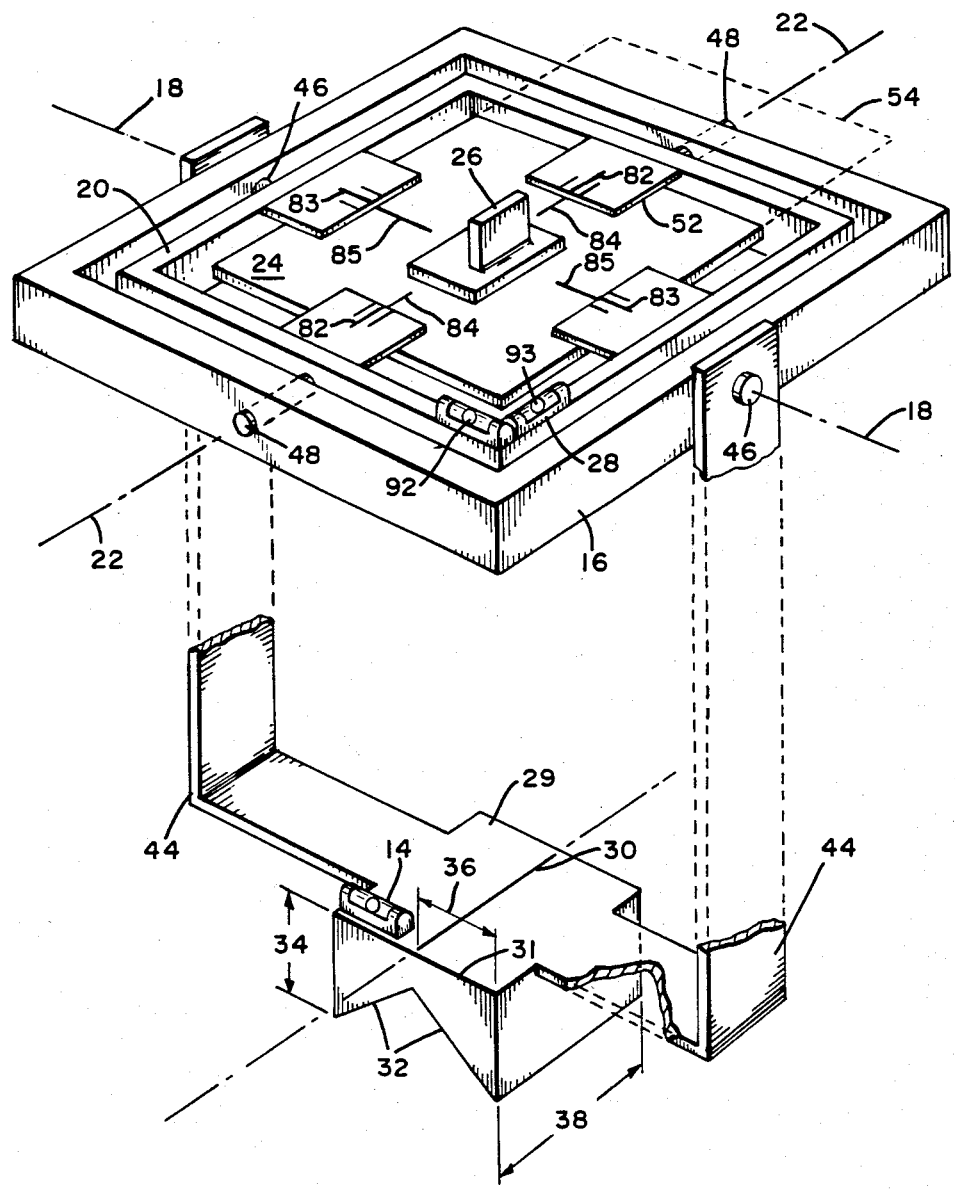
FIG. 5 shows a perspective view of the alignment device of the invention.

FIGS. 2 and 5 illustrate the alignment apparatus of the invention employed to align a selected object, such as casting nozzle 3, with respect to a top-dead-center portion 8 of a cylindrical roll, such as rotatable chill roll 4. Support base 10 is adapted to mount on a peripheral, circumferential surface, such as quench surface 12, of the chilled roll. A level indicator means, comprised of bubble level indicator 14 mounted on base 10, indicates the orientation of the base, and an outer frame 16 is pivotably mounted on base 10 to pivot about an outer gimbal axis 18. An inner frame 20 is pivotably mounted in outer frame 16 and adapted to rotate about an inner gimbal axis 22. Inner gimbal axis 22 lies substantial parallel to a plane defined by outer frame 16 and substantially perpendicular to outer gimbal axis 18. Positioning plate 24 is moveably mounted in inner frame 20 and adapted to move and translate along a reference plane defined by inner frame 20. Follower means, such as an extending tang 26, connects to positioning plate 24 and is adapted to align plate 24 with a selected portion of nozzle 3. Reference means, comprised of a dual axis bubble level indicator 28 and reference lines 82-85, indicate the relative alignment of positioning plate 24 with respect to the top-dead-center 8 of chill roll 4.

Support base 10 includes a top surface 29 and a top-dead-center reference portion, such as line 30, oriented across the width dimension 38 thereof. At least two support legs 32 of substantially equal length 34 connect to base 10 and are symmetrically disposed on either side of base reference line 30. The legs are located at substantially equal distances 36 from reference line 30, and in the shown embodiment, legs 32 are parallel to each other and extend across the width of base 10. Contact surfaces 40 of legs 32 are adapted to mount onto the quench surface 12 of chill roll 4 and are configured to maintain bilateral symmetry with respect to top-dead-center reference line 30. Thus, support base 10, as shown, has a configuration of a block with an inverted "V" cutout therein; i.e. a V-block. It is readily apparent, however, that other leg configurations would be equivalent, provided the leg contact surfaces have bilateral symmetry with respect to reference line 30. A bubble level indicator 14 mounted on top surface 29 indicates when the top surface is in a substantially horizontal position.

Since legs 32 are of substantially equal length and are symmetrically disposed equal distance from base reference line 30 on either side thereof, support base 10 readily mounts on rolls of different diameters without modification. Also, when base 10 is mounted on a cylindrical roll and positioned such that bubble level indicator 14 indicates a level, horizontal position, the configuration effectively positions base reference line 30 directly over the top-dead-center portion 8 of roll 4 and aligns line 30 parallel to the axis of rotation 90 (FIG. 4) of the roll. Rotational axis 90 is ordinarily positioned substantially parallel to the local horizontal.

Outer frame 16 may be of various shapes such as octagonal or circular but preferably is rectangular in shape. The frame is supported by base brackets 44 which are of approximately equal length and rigidly connected to base 10 with fasteners or by welding. Alternatively, the brackets can be formed as integral parts of base 10 in a one-piece design. Pivot bearing 46 pivotably connects outer frame 16 to brackets 44 and effectively define an outer gimbal axis 18 about which the outer frame rotates. Preferably, the outer gimbal axis is positioned parallel to the front edge 31 of top surface 29 and thus becomes parallel to the local horizontal when base 10 is mounted and leveled on top of the chill roll.

Frame pivot bearings 48 rotatably connect inner frame 20 to outer frame 16 to rotate about inner gimbal axis 22. Axis 22 is oriented substantially parallel to a plane 50 defined by outer frame 16 and is aligned substantially perpendicular to the outer gimbal axis 18.

Figure 9:
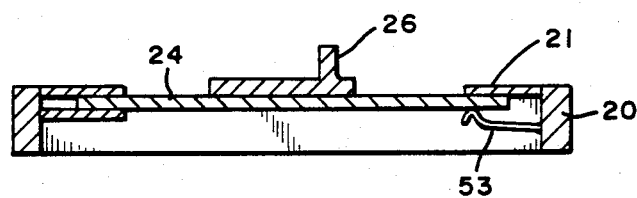
FIG. 9 shows a fractional, cross-sectional view of a positioning plate mounted in an inner frame.

Plate support means, such as frame brackets 52, connect to inner frame 20 and support positioning plate 24 within the frame while also allowing plate 24 to move freely along a reference plane 54 defined by inner frame 20. Optionally, bracket 52 may be comprised of springs 53 which resilient urge plate 24 against extending flange portions 21 of inner frame 20, as illustrated in FIG. 9. While sliding bearing surfaces on positioning plate 24 and frame brackets 52 are adequate for most purposes, other types of bearings may be selected and employed by persons skilled in the art, if desired.

Figure 6:
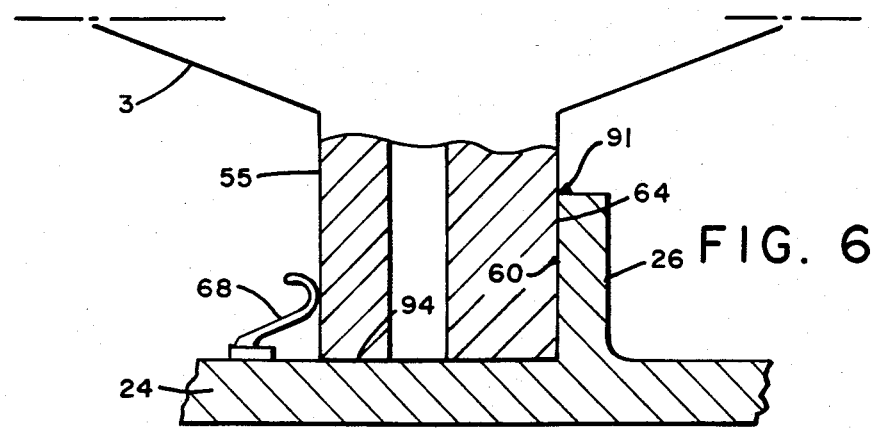
FIG. 6 shows a fractional, cross-sectional view of a nozzle follower means comprised of an extending tang.

A follower means, such as the extending tang 26 shown in FIG. 6, is connected to positioning plate 24 and adapted to abut against nozzle exit portion 55. Such an arrangement aligns and indexes positioning plate 24 with nozzle 3. Tang 26 may be adapted to abut an interior surface of nozzle 3. However, since the nozzle orifice is typically quite small, often less than 1 mm, tang 26 is preferably abutted against an exterior surface 60 of the nozzle, and an indexing means, such as index marker 91, is used to align the tang with a selected portion of surface 60. In this configuration, a machined tang surface 64 extends normal to positioning plate 24 and mates with a corresponding, machined nozzle surface 60. Spring means 68 maintains a positive contact between tang 26 and nozzle 3 to ensure that the tang accurately follows the position of the nozzle exit portion.

Figure 4:
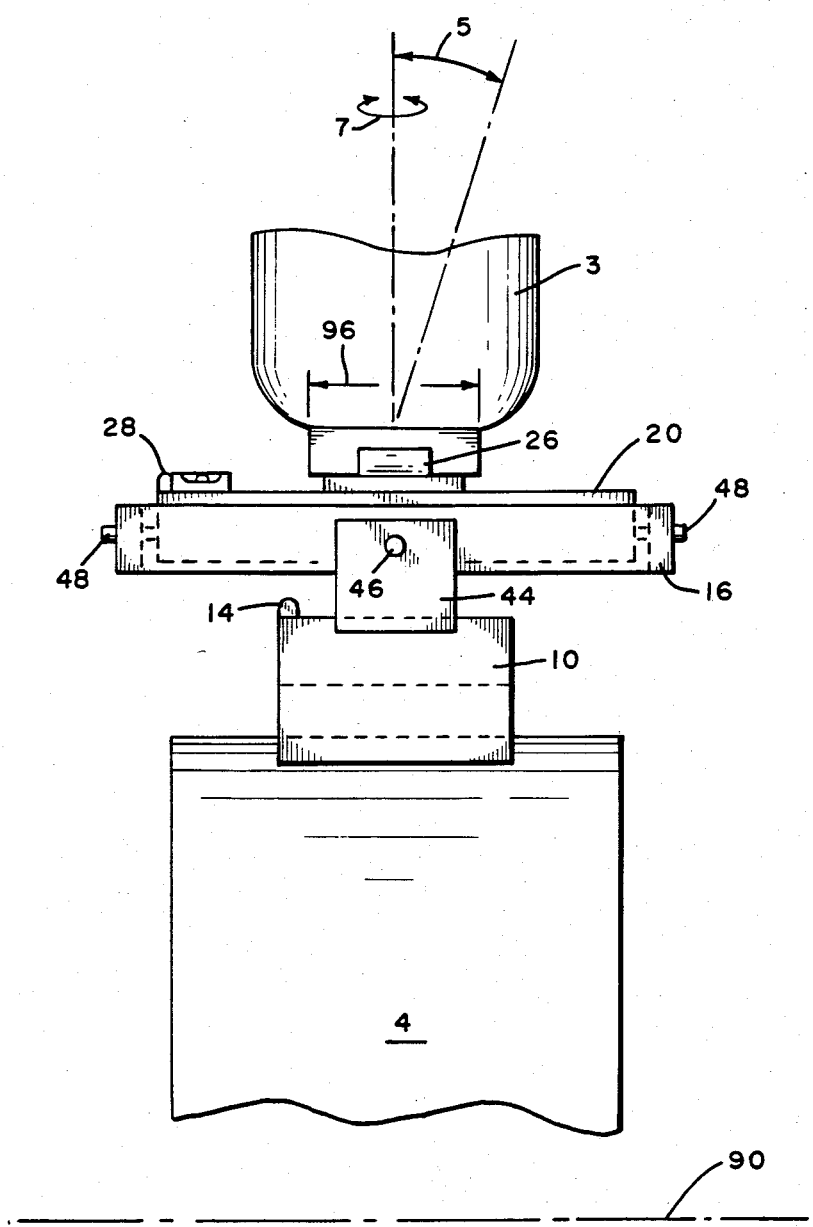
FIG. 4 shows a side elevational view of the alignment device of the invention.

In addition, a selected portion of the nozzle, such as surface 94, is adapted to contact a portion of reference plate 24 to align plate 24 with the nozzle transverse dimension 96, which is measured along the direction of wheel axis 90 (FIG. 4).

Figure 7:
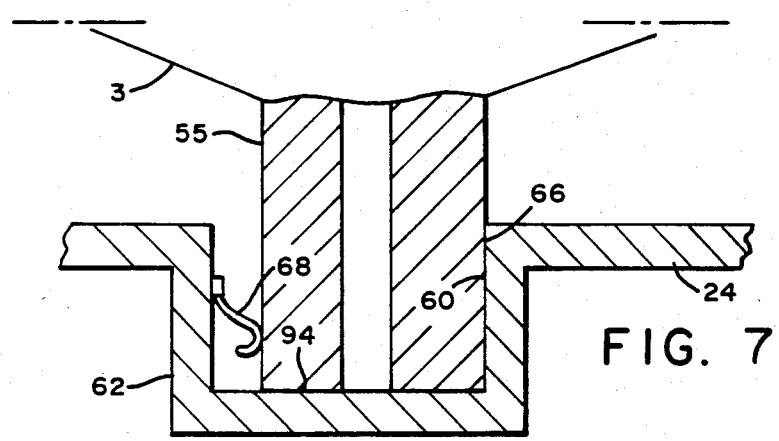
FIG. 7 shows a fractional, cross-sectional view of a nozzle follower comprised of a socket means.

An alternative follower means is comprised of a socket 62 formed in positioning plate 24, as illustrated in FIG. 7. In this embodiment, socket 62 is sized to accommodate positioning of nozzle 3 therein and has a machined socket mating surface 66. Socket mating surfacing 66 extends normal to positioning plate 24 and is adapted to mate with machined nozzle surface 60. Spring means 68 urge nozzle 3 against surface 66 to maintain positive contact therewith and ensure that plate 24 accurately follows the position of nozzle 3. In addition, nozzle surface 94 contacts the bottom of socket 62. The socket bottom is oriented substantially parallel to plate 24 to align the nozzle transverse dimension 96 with the reference plate.

Figure 8:
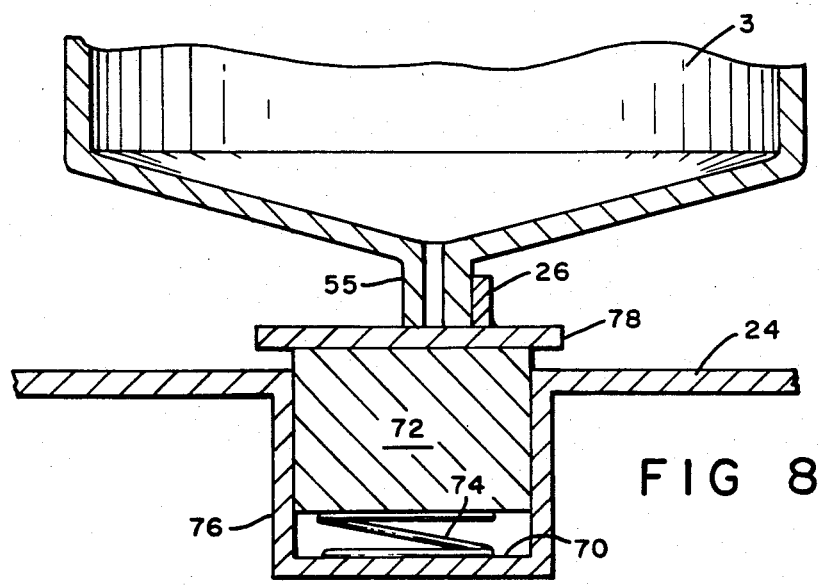
FIG. 8 shows a nozzle follower means resiliently connected to the positioning plate.

To prevent excessive compressive forces between nozzle 3 and positioning plate 24, the follower means can be resiliently connected to plate 24. FIG. 8 illustrates an embodiment wherein a receiver socket 70 is disposed in plate 24. The side walls 76 of the socket are oriented perpendicular to plate 24. Support bearing member 72 slidably mounts within the receiver socket and is adapted to move up and down perpendicular to plate 24 along the side walls of receiver socket 70. A minimum amount of clearance is maintained therebetween to minimize any free movement that would reduce alignment accuracy. Support member 78 connects to bearing member 72 and is oriented parallel to plate 24. Alignment tang 26 or, alternatively, a receiver socket 70 extends perpendicular to support member 78. A resilient buffer, such as support spring 74 interposed between the bottom of receiver socket 70 and bearing member 72, absorbs excessive forces that develop when nozzle 3 is brought against support member 78 and tang 26. As a result, the configuration minimizes excessive forces between nozzle 3 and positioning plate 24 that could damage the nozzle.

Referring to FIG. 5 there is shown a preferred reference means which includes a gimbal level indicator means, such as dual axis bubble level indicator 28; frame reference lines 82, 83 located on innerframe 20; and plate reference lines 84, 85 located on positioning plate 24. Optionally, the gimbal level indicator means may be comprised of a circular bubble level which indicates a level position with respect to all directions at a single bubble reading.

Dual axis bubble level indicator 28 indicates the orientation of two mutually orthogonal axes located parallel to a plane defined by positioning plate 24. Indicator 28 preferably mounts on inner frame 20 with one element of indicator 28 aligned parallel to outer gimbal axis 18, and the other indicator element aligned parallel with inner gimbal axis 22. Thus, when both elements of indicator 28 indicate a level, horizontal orientation, positioning plate 24 will be oriented in a position substantially parallel to the local horizontal. Similarly, when the bubbles are displaced from the level position, bubbles 92 and 93 indicate an amount of tilt offset 5 of positioning plate 24 about inner gimbal axis 22 and outer gimbal axis 18, respectively, as illustrated in FIGS. 2 and 4.

Colinear frame reference lines 82 are located directly over top-dead-center reference line 30 of base 10 and parallel thereto. Thus, when support base 10 is mounted on quench surface 12 over the top-dead-center 8 of roll 4, reference lines 82 extend parallel to the rotational axis 90 of chill roll 4 and are positioned directly over the roll top-dead-center. Frame references line 83 are colinear and positioned to extend perpendicular to reference lines 82.

The plate reference lines are selectively aligned with the follower means. Preferably, colinear plate reference lines 84 extend along plate 24 and are aligned coplanar with a machined surface of the follower means, for example the machined surface 64 of tang 26. Colinear plate reference lines 85 extend perpendicular to reference lines 84 and are preferably centered on tang 26. Thus, when tang 26 is abutted against nozzle 3 the relative alignments of frame reference lines 82 and 83 with respect to plate reference lines 84 and 85, respectively, indicate the amounts of angular twist 7 and linear displacement of nozzle 3 relative to the top-dead-center reference line 30 on base 10. Nozzle 3 is then moved until preselected linear and angular twist displacements are established between the frame reference lines 82 and 83 and the plate reference lines 84 and 85, respectively.

For example, to align nozzle 3 directly over the top dead center of chill roll 4 with no tilt offset from the local vertical, base 10 is first mounted on quench surface 12 of the chill roll. Base 10 is located at a selected position along the axial length of the roll and oriented such that bubble level indicator 14 indicates a horizontal, level position. This positioning places base reference line 30 directly over the top-dead-center portion of the chill roll. Nozzle 3 is moved into approximate position over chill roll 4 and machine surfaces 60 of the nozzle is brought into contact with machined surface 64 of tang 26. Typically, positioning plate 24 will slide within inner frame 20 and the inner and outer frames will rotate about their respective gimbal axes to accommodate placement of tang 26 and plate 24 directly against nozzle 3. Nozzle 3 is tilted to rotate outer frame 16 about outer gimbal axis 18 and to rotate inner frame 18 about inner gimbal axis 22 until both elements of bubble level indicator 28 indicate a level, horizontal position. Nozzle 3 is then translated and twisted to slide positioning plate 24 within frame 20 until plate reference lines 84 and 85 are aligned with frame reference lines 82 and 83, respectively. At this point nozzle 3 will be aligned over the top-dead-center of chill roll 4 with no tilt offset from the local vertical.

Having thus described the invention in rather full detail, it will be understood that these details need not be strictly adhered to but that various changes and modifications may suggest themselves to one skilled in the art, all falling within the scope of the invention as defined by the subjoined claims.

I claim:

1. An alignment apparatus for aligning a selected object with respect to a top-dead-center portion of a cylindrical roll, comprising:
   (a) a support base adapted to mount on a peripheral, circumferential surface of said cylindrical roll and over the top-dead-center portion thereof;

(b) level indicator means mounted on said base for indicating the orientation of said base;

(c) an outer frame which is pivotably mounted on said base to pivot about an outer gimbal access;

(d) an inner frame which is pivotably mounted in said outer frame and adapted to rotate about an inner gimbal axis, said inner gimbal axis being oriented substantially perpendicular to said outer gimbal axis;

(e) a positioning plate moveably mounted in said inner frame and adapted to move along a reference plane defined by said inner frame;

(f) follower means connected to said positioning plate for aligning said positioning plate with a selected portion of said object; and (g) reference means for indicating the relative alignment of said positioning plate with respect to the top-dead-center of said cylindrical roll.

2. An apparatus as recited in claim 1, wherein said support base comprises:

(a) a top surface having a top-dead-center reference portion;

(b) at least two support legs of substantially equal length connected to said base and symmetrically disposed about said top-dead-center reference portion.

3. An apparatus as recited in claim 1 wherein said level indicator means on said base is comprised of a bubble level indicator.

4. An apparatus as recited in claim 1, wherein said follower means comprises an extending tang operably connected to said positioning plate and adapted to align said positioning plate with an exit portion of a casting nozzle.

5. An apparatus as recited in claim 1, wherein said follower means comprises a socket means operably connected to said positioning plate and adapted to align said positioning plate with an exit portion of a casting nozzle.

6. An apparatus as recited in claim 1, wherein said follower means is resiliently connected to said positioning plate to avoid excessive compressive force between said object and said alignment plate.

7. An apparatus as recited in claim 1, wherein said reference means comprises:

(a) a gimbal level indicator means for determining the orientation of said positioning plate relative to the local horizontal;

(b) frame reference lines located on said inner frame; and (c) plate reference lines located on said positioning plate and adapted to indicate a relative position between said inner frame and said positioning plate.

8. An apparatus a recited in claim 7, wherein said gimbal level indicator means comprises a dual axis, bubble level indicator which indicates the orientation of two mutually orthogonal axes located parallel to a plane defined by said positioning plate.

9. A method for aligning a selected object with respect to a top-dead-center portion of a cylindrical roll, comprising the steps of:

(a) mounting an outer frame over the top-dead-center portion of said cylindrical roll;

(b) pivoting said outer frame about an outer gimbal axis;

(c) pivoting an inner frame about an inner gimbal axis that is located within said outer frame and is oriented substantially perpendicular to said outer gimbal axis;

(d) moving a positioning plate along a reference plane defined by said inner frame;

(e) aligning said positioning plate with a selected portion of said object;

(f) indicating the relative position between said positioning plate and said inner frame; and (g) moving said object along with said positioning plate to establish a selected relative position between said positioning plate and said inner frame, thereby aligning said object with respect to the top-dead-center of said roll.

10. A method as recited in claim 9, further comprising the step of resiliently urging a follower means, which is connected to said positioning plate, against the selected portion of said object to align said positioning plate therewith.

11. A method as recited in claim 9, further comprising the step of orienting said outer gimbal axis substantially parallel to the local horizontal.

12. A method as recited in claim 9, which is adapted to align a casting nozzle with respect to the top-dead-center portion of a rotatable chill roll to cast continuous metal strip at high speed.

* * * * *